United States Patent [19]

Speranza et al.

[11] Patent Number: 5,130,382

[45] Date of Patent: Jul. 14, 1992

[54] HYDROXY TERMINATED POLYOXYPROPYLENE POLYAMIDES

[75] Inventors: George P. Speranza; Wei-Yang Su, both of Austin, Tex.

[73] Assignee: Texaco Chemical Company, White Plains, N.Y.

[21] Appl. No.: 501,815

[22] Filed: Mar. 30, 1990

[51] Int. Cl.$^5$ .............................................. C08L 77/06
[52] U.S. Cl. ................................... 525/420; 525/434; 525/424; 528/340
[58] Field of Search ............................... 525/434, 420

[56] References Cited

U.S. PATENT DOCUMENTS

| | | | |
|---|---|---|---|
| 3,168,498 | 2/1965 | Runge | 525/420 |
| 3,397,816 | 7/1968 | Ess et al. | 525/434 |
| 4,128,525 | 12/1978 | Yeakey et al. | 260/29.1 |
| 4,182,848 | 1/1980 | Schmidle et al. | 528/376 |
| 4,218,351 | 8/1980 | Rasmussen | 260/18 |
| 4,429,081 | 1/1984 | Mumcu et al. | 525/420 |
| 4,751,255 | 6/1988 | Bentley et al. | 531/163 |
| 4,839,441 | 6/1989 | Cuzin et al. | 528/328 |

OTHER PUBLICATIONS

Muller, "Further Developments in the Vulkollan Field", *Polyurethanes*, Mar. 1958, pp. 195–205.
Athey, "Water Resistance in Liquid Urethane Vulcanizates", *Rubber Age*, Feb. 1965, pp. 705–712.

*Primary Examiner*—Ana L. Carrillo
*Attorney, Agent, or Firm*—Jack H. Park; Kenneth R. Priem; Carl G. Ries

[57] ABSTRACT

Hydroxy terminated polyamides are prepared having the formula:

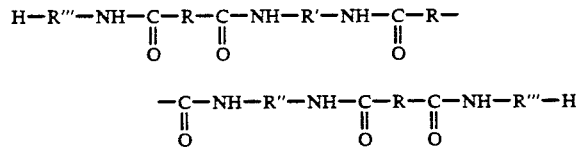

wherein

R represents a defined hydrocarbon group,

R' and R'' represents defined oxypropylene groups, and R''' represents a defined oxyethylene group, the hydroxy terminated polyamide having been prepared by first preparing an intermediate dicarboxylic acid terminated polyoxypropylene polyamide by reacting an excess of a dicarboxylic acid component with a diamine mixture composed of a higher molecular weight polyoxypropylene diamine and a lower molecular weight polyoxypropylene diamine, and by reacting the intermediate polyamide with a molar excess of an oxyethylene amino alcohol.

20 Claims, No Drawings

HYDROXY TERMINATED POLYOXYPROPYLENE POLYAMIDES

BACKGROUND OF THE INVENTION

1. Technical Field of the Invention

This invention relates to hydroxy terminated polyamides and to the method by which they are prepared.

More particularly, this invention relates to polyoxypropylene polyamides terminated with primary hydroxyl groups which are useful in the preparation of polyurethanes having improved chemical resistance that can be used in lining blankets and clothing, as filters, as headliners for automobiles, etc. Still more particularly, this invention relates to hydroxy terminated polyamides having the formula:

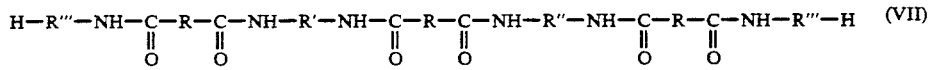

wherein:

a) R represents an aliphatic hydrocarbon group containing from 3 to about 34 carbon atoms or an aromatic group containing from 6 to about 34 carbon atoms, b) R' represents an oxypropylene group having the formula:

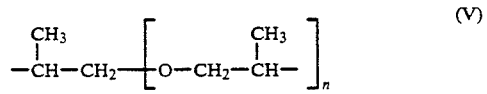

wherein n is a positive number having a value of 2 to about 15, and c) R'' represents an oxypropylene group having the formula:

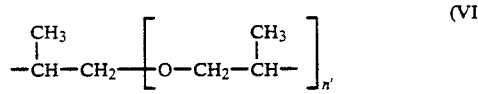

wherein n' is a positive number having a value of 15 to about 50, and d) R''' represents an oxyethylene group having the formula:

wherein n'' is a positive number having a value of 1 to 4.

In accordance with another embodiment, the present invention is directed to a method for preparing hydroxy terminated polyamides wherein a molar excess of a dicarboxylic acid component is reacted with a diamine mixture composed of a higher molecular weight polyoxypropylene diamine and a lower molecular weight polyoxypropylene diamine, all as hereinafter defined, to provide a dicarboxylic acid polyoxypropylene polyamine intermediate which is reacted with an oxyethylene amino alcohol, as hereafter defined, in order to provide the desired hydroxy terminated polyamide.

2. Prior Art

The earliest polyurethane developments involved polyester polyols (see E. Muller, *Rubber Plastics Age* 39, 155 (1958). Polyethylene adipate was an early choice. It is a hard crystalline wax. The inherent crystallinity is the cause of spontaneous crystallinity of polyurethane rubbers made using this product. Poly-1,2-propylene adipate is a liquid which gives non-crystallizing rubbers that are considerably weaker than those from polyethylene adipate. A blend of 70 parts polyethylene adipate and 30 parts polypropylene adipate gives elastomers with good properties while the tendency to crystallize is largely suppressed. Further developments resulted in the products derived from diethylene glycol and adipic acid. This combination along with the addition of small amounts of other diols and triols such as trimethylol propane led to the polyesters used today in the preparation of polyester-based polyurethanes.

The major drawback of polyester based polyurethanes is their hydrolytic instability (see Athey, R. J., "Water Resistance of Liquid Urethane Vulcanizates", *Rubber Age* 96, 5(1965) 705–712). Athey found that with prolonged exposure under severe conditions of high humidity polyesters were severely degraded, whereas polyethers held their properties well. He also performed experiments in wet and dry oil. When moisture was present in the oil, the polyesters degraded very badly. Polyether based foams suffered only slightly. The polyester linkage was the point of attack. Although polyesters have been replaced by polyethers in most flexible foam markets, polyester based polyurethanes have an important place in the polyurethane economy. The polyester urethanes can be flame laminated and show good chemical resistance. They are used in lining in blankets and clothing, for filters and headliners for automobiles. These uses along with the fact that they can be formulated to provide some fire-retardancy explain the interest held in flexible polyurethane foams based on polyesters. Hydroxy-terminated polyesters based on dimer acids have been made. Foams prepared from dimer acid polyesters show improved hydrolytic stability over those made from adipate polyesters. This is because the dimer acid based products are more hydrophobic in nature and contain a lower weight percentage of ester groups. Flexible foams made from dimer acid esters have excellent properties. *Polyurethane Foams Technology, Properties and Applications*, by Arthur H. Landrock, *Plastic Report*, 37, January 1969, p. 18.

SUMMARY OF THE INVENTION

Hydroxy terminated polyamides are prepared in accordance with the present invention that have the formula:

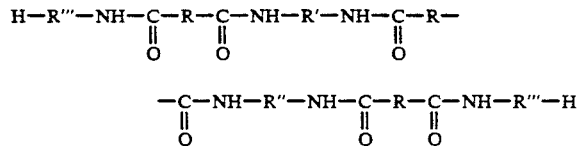

wherein R represents a hydrocarbon group, R' and R'' represents oxypropylene groups, and R''' represents an oxyethylene group as hereinafter defined, The hydroxy terminated polyamides are prepared from an intermediate dicarboxylic acid terminated polyoxypropylene polyamide. The intermediate is prepared by reacting a molar excess of a dicarboxylic acid component with a higher molecular weight polyoxypropylene diamine component and with and a lower molecular weight polyoxypropylene diamine. The intermediate polyamide is reacted with a molar excess of an oxyethylene amino alcohol.

The hydroxy terminated polyamides of the present invention have molecular weights above about 2,500, are liquid at ambient temperatures and are useful as substitutes for polyesters in the preparation of polyurethanes.

The polyamide linkages that are present in the hydroxy terminated polyamides of the present invention do not hydrolyze as readily as the polyester linkages of polyester resins. Therefore, the hydroxy terminated polyamides of the present invention can be used to prepare polyamide polyurethane products including foams, elastomers, adhesives and sealants.

DETAILED DESCRIPTION

The starting materials for the present invention are a lower molecular weight polyoxypropylene diamine, a higher molecular weight polyoxypropylene diamine, an oxyethylene amino alcohol and a dicarboxylic acid component having a molecular weight of about 130 to about 1,000 and selected from the group consisting of aliphatic dicarboxylic acids containing from 6 to about 36 carbon atoms, aromatic dicarboxylic acids containing from 8 to about 36 carbon atoms and the anhydrides and lower $C_1-C_4$ alkyl esters thereof.

The lower molecular weight polyoxypropylene diamine starting material for the present invention is a polyoxypropylene diamine having the formula:

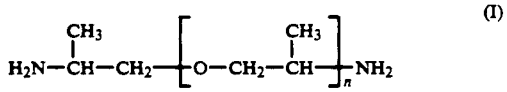

(I)

wherein n is a positive number having a value of 2 to about 15,

When n has a value of 2, the lower molecular weight polyoxypropylene diamine will have a molecular weight of about 200; when n has a value of 15, the lower molecular weight polyoxypropylene diamine will have a molecular weight of about 1,000. Polyoxypropylene diamines within the definition of formula I are available commercially. For example, Texaco Chemical Company offers a polyoxypropylene diamine sold under the tradename "JEFFAMINE ® D-230" which has a molecular weight of about 230 and a product "JEFFAMINE ® D-400" which has a molecular weight of about 400.

The higher polyoxypropylene diamine starting material of the present invention should have a molecular weight at least 600 molecular weight units higher than the molecular weight of the lower molecular weight diamine and is a polyoxypropylene diamine having the formula:

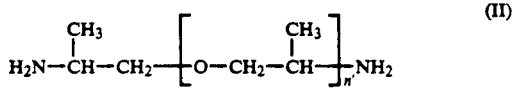

(II)

wherein n' is a positive number having a value of 15 to about 50,

When n' has a value of about 15, the molecular weight of the polyoxypropylene diamine will be about 1,000. When n' has a value of 50, the molecular weight of the polyoxypropylene diamine will be about 3,000.

Polyoxypropylene diamines falling within the definition of formula II are also available commercially. For example, Texaco Chemical Company offers a product, "JEFFAMINE D-2000" having a molecular weight of about 2000, i.e., a product of formula II wherein n' has a value of about 32.

The oxyethylene amino alcohol starting material is an amino alcohol having the formula:

$$NH_2-[CH_2CH_2O]_{n''}H \qquad (III)$$

wherein n" represents a positive number having a value of 1 to 4.

Amino alcohols falling within this formula include commercial products such as monoethanolamine (wherein n" has a value of 1) and a product sold by Texaco Chemical Company under the tradename "DI-GLYCOLAMINE" wherein n" has a value of 2. This product may also be referred to as diethylene glycol monoamine. In like fashion, when n" is 3 the product will be triethylene glycol monoamine, and when n" is 4 the product will be tetraethylene glycol monoamine.

The Dicarboxylic Acid Starting Material

The dicarboxylic acid starting material for the present invention may be any suitable aliphatic dicarboxylic acid containing from about 6 to about 36 carboxylic acids or aromatic dicarboxylic acid containing from about 8 to about 36 carbon atoms, having an average molecular weight of about 200 to about 1000 or an anhydride or a lower alkyl ester thereof wherein the alkyl group contains from about 1 to 4 carbon atoms and, more preferably, is methyl.

Examples of suitable aliphatic dicarboxylic acids that may be used include adipic acid, dodecanedioic acid, glutaric acid, azelaic acid, sebacic acid, the so-called "dimer acid" prepared by the dimerization of unsaturated monocarboxylic acids such as oleic acid, linoleic acid, eleostearic acid, and mixtures which are sold commercially as "tall oil fatty acids".

Other suitable dicarboxylic acids that may be used include brasslic acid, octadecanedioic acid and thapsic acid.

Examples of aromatic dicarboxylic acid that may be used as starting materials for the present invention include acids such as terephthalic acid, isophthalic acid, 1,1,3-trimethyl-3-phenylidan-4',5-dicarboxylic acid, 2,6-naphthalene dicarboxylic acid, t-butyl isophthalic acid, etc. (i.e., benzene dicarboxylic acids and 2-phenyl pentanedioic acid, etc.).

THE METHOD OF THE PRESENT INVENTION

Preparation of the Intermediate Dicarboxylic Acid Terminated Polyoxypropylene Polyamide The hydroxy terminated polyamides of the present invention are prepared by the method of the present invention from dicarboxylic acid terminated polyoxypropylene polyamides having the formula:

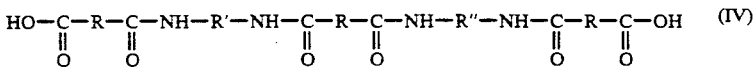

wherein:

a) R represents an aliphatic hydrocarbon group containing from 4 to about 34 carbon atoms or an aromatic group containing from 6 to about 34 carbon atoms, b) R' represents an oxypropylene group having the formula:

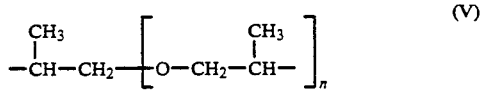

wherein n is a positive number having a value of 2 to about 15, and c) R" represents an oxypropylene group having the formula:

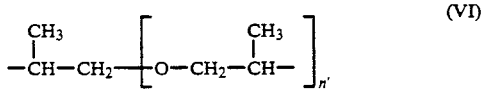

wherein n' is a positive number having a value of 15 to about 50.

The intermediate dicarboxylic acid terminated polyoxypropylene polyamide is prepared by reacting a molar excess of a dicarboxylic acid component with a diamine mixture composed of a higher molecular weight polyoxypropylene diamine having formula II given above and a lower molecular weight polyoxypropylene diamine having the formula I given above.

From about 1 to about 4 moles of the lower molecular weight polyoxypropylene diamine should be used per mole of the higher molecular weight polyoxypropylene diamine in preparing the diamine mixture. More preferably, from about 1 to about 3 moles of the lower molecular weight diamine will be used per mole of the higher molecular weight diamine and still more preferably, about equal molar amounts of the lower molecular weight and the higher molecular weight polyoxypropylene diamine will be used.

As indicated, a molar excess of the dicarboxylic acid component should be used. Although even a slight molar excess of about 0.5 moles may be adequate, it is preferable to use the dicarboxylic acid in the ratio of about 1.5 moles of dicarboxylic acid per mole of diamine mixture.

The dicarboxylic acid should be reacted with the diamine mixture in an appropriate reaction vessel created with a reflux condenser, an agitator and temperature control means.

The reaction is preferably conducted in the presence of an antioxidant such as Inganox 1010 sold by Ciba Geigy.

Reaction conditions suitably include a temperature within the range of about 170° to about 280° C., such as a temperature within the range of about 170° to about 250° C. and a pressure which may be as low as 0.1 mm Hg and as much as 20 atmospheres, but which is preferably atmospheric pressure.

The reaction is suitably conducted for a time within the range of about 2 to about 10 hours and, more preferably, for a time within the range of about 3 to about 5 hours.

At the end of the reaction, and after the reaction mixture has cooled to an appropriate holding temperature such as a temperature within the range of about 100° to about 150° C., a molar excess of an oxyethylene amino alcohol, based on the intermediate dicarboxylic acid polyoxypropylene polyamide is added to the reaction mixture and the reaction is continued at a temperature within the range of about 170° to about 280° C. and a pressure which may be as low as about 0.1 mm Hg and as high as 20 atmospheres, but which is preferably atmospheric, in order to provide the hydroxy terminated polyamide of the present invention.

More preferably, the reaction between the oxyethylene amino alcohol and the dicarboxylic acid intermediate will be conducted at a temperature within the range of about 200° to about 280°, and more preferably from about 220° to about 260° C. Reaction time may suitably be within the range of about 0.5 to 5 hours and more preferably within the range of about 1 to about 3 hours.

Manufacture of Polyurethanes

The components used in the manufacture of polyurethanes include an organic polyisocyanate, a catalyst and the hydroxy terminated polyamide of the present invention which may be used alone or in mixture with conventional polyoxypropylene polyols or polyester polyols. If it is desired to make a polyurethane foam, a foaming agent, and a foam stabilizer will also be added. Other conventional additives such as fire retardants, dyes, fillers, etc., may also be included in the formulation.

Typical aromatic polyisocyanates that may be used in the practice of the present invention include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'diisocyanate, aliphatic-aromatic diisocyanates, such as xylylene-1,4-diisocyanate, xylylene-1,2-diisocyanate, xylylene-1,3-diisocyanate, bis(4-isocyanatophenyl) methane, bis(3-methyl-4-isocyanatophenyl) methane, and 4,4'-diphenylpropane diisocyanate.

Preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

The more preferred methylene-bridged polyphenyl polyisocyanate mixtures used here contain from about 20 to about 100 wt. % methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt. % methylene diphenyl diisocyanate isomers, of which 20 to about 95 wt. % thereof is the 4,4'-isomer with the remainder being polymethylene polyphenyl polyisocyanates of higher molecular weight and functionality that have an average functionality of from about 2.1 to about 3.5. The isocyanate mixtures are known materials and can be prepared, for example, by the process described in U.S. Pat. No. 3,362,979, issued Jan. 9, 1968 to Floyd E. Bentley.

The catalysts which may be used to make the foams are well known. There are two general types of catalyst, tertiary amines and organo-metallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexahydroaniline, diethylpiperazine, N-ethylmorpholine, dimethylaniline, nicotine, dimethylaminoethanol, tetramethylpropanediamine, and methyltriethylenediamine. Organo-metallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organo-metallic compound are often used together in the polyurethane reaction.

As indicated, the polyol component to be used in making a polyurethane in accordance with the present invention is the hydroxy terminated polyamide of the present invention which is used alone or in admixture with a conventional polyol.

Conventional polyols comprise polyoxypropylene polyether polyols having a hydroxyl number between 20 and 60 and a functionality of 2 to 8.

Normally, propylene oxide will constitute from about 80 to about 100 wt. % of the total polyol composition. Up to about 20 wt. % of ethylene oxide may be utilized if desired, based on the weight of the propylene oxide.

A wide variety of initiators may be alkoxylated to form useful polyoxypropylene polyols. Thus, for example, polyfunctional amines and alcohols of the following types may be alkoxylated: monoethanolamine, diethanolamine, triethanolamine, ethylene glycol, polyethylene glycols, propylene glycols, polypropylene glycols, glycerine, trimethylolpropane, pentaerythritol, sorbitol, sucrose, and mixtures thereof.

Such above amines or alcohols may be reacted with an alkylene oxide component consisting of 100 to about 80 wt. % of propylene oxide and 0 to about 20 wt. % of ethylene oxide using techniques known to those skilled in the art. Thus, for example, the reaction of alkylene oxides with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol will determine the amount of alkylene oxide used to react with the initiator. The polyoxypropylene polyether polyol may be prepared by reacting the initiator with propylene oxide or by reacting the initiator first with propylene oxide followed by ethylene oxide or vice versa in one or more sequences to give a so-called block polymer chain or by reacting the initiator with a mixture of propylene oxide and ethylene oxide to achieve a random distribution of such alkylene oxides. As noted above, the polyoxypropylene polyether polyols useful here have a hydroxyl number ranging from about 20 to about 60. The reaction mixture is then neutralized and water and excess reactants are stripped from the polyol.

In the production of polyurethane foams in the practice of the invention, other known additives are necessary. One such constituent is the blowing agent. Some examples of such materials are water, trichloromonofluoromethane, dichlorodifluoromethane, dichloromonofluoromethane, 1,1-dichloro-1-fluoromethane, 1,1-difluoro-1,2,2-trichloroethane, chloropentafluoroethane, and the like. Other useful blowing agents including low-boiling hydrocarbons such as butane, pentane, hexane, cyclohexane, and the like. See U.S. Pat. No. 3,072,582, for example.

Conventional formulation ingredients are also employed, such as, for example, foam stabilizers also known as silicone oils or emulsifiers. The foam stabilizer may be an organic silane or siloxane. For example, compounds may be used having the formula:

$$RSi[O-(R\ SiO)_n-(oxyalkylene)_mR]_3$$

wherein R is an alkyl group containing from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

The flame retardancy of the polyurethane composition can be enhanced by using known fire retardants. Examples of suitable flame retardants are: tris(1,3-dichloropropyl)phosphate, tris(2,3-dibromopropyl)phosphate, 2,2-bis(chloromethyl)-1,3 propylene bis[-di(2-chloroethyl)phosphate], tris(2-chloroethyl)phosphate, tris(2-chloropropyl)phosphate, bis(dichloropropyl)tribromopentyl phosphate, tetrakis-(2-chloroethyl)ethylene diphosphate (sold by Olin Chemicals as THERMOLIN® 101), FYROL® EFF (oligomeric chloroalkyl phosphate, sold by Stauffer Chemical Co.), tricresyl phosphate cresyl diphenyl phosphate, chlorinated paraffins, and brominated paraffins. Halogenated phosphates are preferred flame retardants in the practice of this invention, such as tris(1,3-dichloropropyl)-phosphate, tris(2-chloro-ethyl)phosphate, FYROL® EFF, and tetrakis(2-chloroethyl)ethylene disphosphate. Although a single flame retardant is preferred from the standpoint of simplicity of formulation, mixtures of two or more of the same type or of different types may be found to give improved performance in some cases, and such mixtures are included in the scope of this invention. The amount of flame retardant can be varied over a wide range of from about 20 to about 60 parts by weight per 100 parts by weight of polyol in the reaction mixture. It is preferred to use from about 20 to about 40 parts by weight.

Rigid polyurethane foams can be made in one step by reacting all the ingredients together at once (one-shot process). The rigid foams can also be made by the so-called "quasi-prepolymer method" wherein a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

EXAMPLES

The present invention will be further illustrated by the following specific examples which are given by way of illustration and which are not intended as limitations on the scope of this invention.

Example 1

(6469-20) General Procedure for the Preparation of Hydroxyl Terminated Polyamides To a one-liter three-necked flask equipped with a thermometer, Dean-Stark trap, stirrer, and nitrogen bleed that went below the surface of the reactants was charged 250 g of JEFFAMINE ® D-2000 amine (0.125 mole), 150 g of JEFFAMIN ® D-400 amine (0.375 mole), 109.5 g of adipic acid (0.75 mole), and 0.3 g of Ultranox ® 236 antioxidant. The mixture was heated to 180° C. for three hours. The reaction mixture was cooled to about 130° C. and 75 g of triethylene glycol monoamine (0.5 mole) was added. The reaction mixture was then heated to 250° C. It was held at this temperature for one hour after no further water was generated. The resulting product was analyzed and the result given in Table I.

Examples 2-7

In the manner described in Example 1, other hydroxyl terminated polyamides were prepared. The results are shown in Table I.

Example 8

Preparation of Polyamide Polyurethane

To a small paper cup was added 40.0 g of the sample of Example 7 (6469-43), 2.0 g of water, 0.6 g of L-711 silicone surfactant, and 0.4 g of N,N'-dimethylpiperazine. After stirring vigorously with a tongue depressor, 33.7 g of Rubinate ® M polymeric isocyanate was charged to the mixture and the contents stirred again. The resulting mixture was poured into a bigger paper cup to produce a hard foam with rise time about 185 seconds. The foam shrank to some extent.

Example 9

Preparation of Polyamide Polyurethane

In the manner described in Example 8, other polyamide-based polyurethanes were prepared. Details of the formulations and foam properties are listed in Table 2. The component numbers are parts by weight. In all cases semiflexible foams were obtained.

Example 10

The procedure of Example 8 was followed except that the sample of Example 6 (6469-32) was used. A foam was obtained which shrank. This run only shows that monoethanolamine terminated polyamides may not be as useful as the longer chain amino alcohols for the preparation of foams.

TABLE I

| | PROPERTIES OF HYDROXYL TERMINATED POLYAMIDES | | | | | | |
|---|---|---|---|---|---|---|---|
| Example | 1 | 2 | 3 | 4 | 5 | 6 | 7 |
| Part by mole | 6469-20 | 6469-21 | 6469-29 | 6469-30 | 6469-31 | 6469-32 | 6469-43 |
| JEFFAMINE ® D-2000 | 1 | 1 | 1 | 1 | 1 | 1 | 1 |
| JEFFAMINE ® D-400 | 3 | 1 | 1 | 3 | 1 | 1 | 1 |
| Adipic Acid | 6 | 3 | 3 | 6 | 3 | 3 | |
| Isophthalic Acid | | | | | | | 3 |
| Monoethanolamine | | | | | | 2 | |
| diglycolamine ® | | | 2 | 4 | | | |
| Triethylene glycol monoamine | 4 | 2 | | | | | 2 |
| Tetraethylene glycol monoamine | | | | | 2 | | |
| Total Acetylatables (meq/g) | 0.64 | 0.62 | 0.56 | 0.62 | 0.56 | 0.59 | 0.49 |
| Acid Value (mg KOH/g) | 2.4 | 2.1 | 3.8 | 3.5 | 2.8 | 0.4 | 4.1 |
| Amine Assay (meq/g) | 0.07 | 0.08 | 0.09 | 0.09 | 0.08 | 0.06 | 0.09 |
| Viscosity (cs at 60° C.) | 6,400 | 2,900 | 3,800 | 8,600 | 3,200 | 4,600 | 9,900 |
| Pourable at R.T. | Yes | Yes | Yes | Yes | Yes | Yes | Yes |
| Compatibility with | 80° C. R.T. | 80° C. R.T. | 80° C. R.T. | 80° C. R.T. | 80° C. R.T. | 80° C. R.T. | 80° C. R.T. |
| 20% SF-5505[1] | NC NC | NC NC | NC NC | NC NC | NC NC | NC NC | |
| 80% SF-5505[1] | C C | C C | C C | NC NC | C C | C C | NC NC |
| 20% JEFFAMINE ® D-2000 | NC NC | NC NC | NC NC | NC NC | NC NC | NC NC | NC NC |
| 80% JEFFAMINE ® D-2000 | C C | C C | C C | C C | C C | C C | NC NC |
| 20% PPG-2000[2] | NC NC | NC NC | NC NC | NC NC | NC NC | NC NC | |
| 80% PPG-2000 | NC NC | C C | C C | NC NC | C C | C C | NC NC |

[1] A 5500 molecular weight triol from Arco.
[2] A 2000 molecular weight polyoxypropylene glycol.

TABLE II

| PREPARATION OF POLYAMIDE POLYURETHANES | | | | | |
|---|---|---|---|---|---|
| Foam No. | A | B | C | D | E |
| Formulation parts by weight | | | | | |
| Samples of Example 1 | 100 | — | — | — | — |
| Example 2 | — | 100 | — | — | — |
| Example 3 | — | — | 100 | — | — |
| Example 4 | — | — | — | 100 | — |
| Example 5 | — | — | — | — | 100 |
| Water | 5.0 | 5.0 | 5.0 | 5.0 | 5.0 |
| L-711 silicone | 2.0 | 2.0 | 2.0 | 2.0 | 2.0 |
| T-9 Catalyst | 1.0 | 1.0 | 1.0 | 1.0 | 1.0 |
| DMP | 0.5 | 0.5 | 0.5 | 0.5 | 0.5 |
| Rubinate ® M[1] | 85.5 | 86.8 | 84.5 | 85.3 | 84.5 |
| Index | 1.03 | 1.05 | 1.03 | 1.03 | 1.03 |
| Rise time, sec. | 134 | 116 | 160 | 128 | 138 |
| Density, pcf | 1.48 | 1.51 | 1.67 | 1.59 | 1.64 |

[1] A polyaryl polyisocyanate sold by ICI.

The foregoing examples are given by way of illustration only and are not intended as limitations on the scope of the present invention, which is defined by the appended claims.

We claim:

1. A method for preparing a polyoxypropylene polyamide terminated with primary hydroxyl groups which comprises:
   a-1) preparing an intermediate dicarboxylic acid polyoxypropylene polyamide reaction product by reacting an excess of a dicarboxylic acid component with a higher molecular weight polyoxypropylene diamine component and a lower molecular weight polyoxypropylene diamine component, said reaction being conducted at a temperature within the range of about 170° to about 280° C. and a pressure within the range of about 0.1 mm of Hg. to about 20 atmospheres to provide said intermediate dicarboxylic acid polyoxypropylene polyamide, and recovering said intermediate dicarboxylic acid polyoxypropylene polyamide,
   a-2) reacting said intermediate dicarboxylic acid polyoxypropylene polyamide with a molar excess of an oxyethylene amino alcohol under reaction conditions including a temperature within the range of about 170° to about 280° C. and a pressure within the range of about 0.1 mm of Hg. to about 20 atmospheres to provide said polyoxypropylene polyamide terminated with primary hydroxyl groups and recovering said polyoxypropylene polyamide terminated with primary hydroxyl groups,
   b) said diamine mixture containing from about 1 to about 4 moles of said lower molecular weight polyoxypropylene diamine per mole of said higher molecular weight polyoxypropylene diamine,
   c) said higher molecular weight polyoxypropylene diamine having a molecular weight at least about 600 molecular weight units higher than said lower molecular weight polyoxypropylene diamine,
   d) said lower molecular weight polyoxypropylene diamine having the formula:

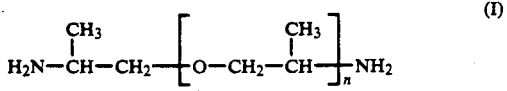

wherein n is a positive number having a value of 2 to about 15,
   e) said higher molecular weight polyoxypropylene diamine having a molecular weight at least 600 molecular weight units higher than said lower molecular weight polyoxypropylene diamine and having the formula:

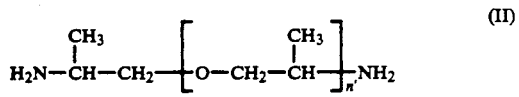

wherein n' is a positive number having a value of 15 to about 50,
   f) said dicarboxylic acid component having a molecular weight of about 130 to about 1,000 and being selected from the group consisting of aliphatic dicarboxylic acids containing from 5 to about 36 carbon atoms, aromatic dicarboxylic acids containing from 8 to about 36 carbon atoms and the anhydrides and lower $C_1$ to $C_4$ alkyl esters thereof,
   g) said oxyethylene amino alcohol having the formula:

$$NH_2-[CH_2CH_2O]_{n''}H \qquad (III)$$

wherein n'' represents a positive number having a value of 1 to 4.

2. A method as in claim 1 wherein the dicarboxylic acid is an aliphatic dicarboxylic acid.

3. A method as in claim 2 wherein the aliphatic dicarboxylic acid is adipic acid.

4. A method as in claim 1 wherein the oxyethylene amino alcohol is monoethanolamine.

5. A method as in claim 1 wherein the oxyethylene amino alcohol is diethylene glycol monoamine.

6. A method as in claim 1 wherein the oxyethylene amino alcohol is triethylene glycol monoamine.

7. A method as in claim 1 wherein the oxyethylene amino alcohol is tetraethylene glycol monoamine.

8. A method as in claim 1 wherein the dicarboxylic acid is an aromatic dicarboxylic acid.

9. A method as in claim 8 wherein the aromatic dicarboxylic acid is isophthalic acid.

10. A method as in claim 1 wherein the oxyethylene amino alcohol is triethylene glycol monoamine.

11. A dihydroxy derivative of a polyoxypropylene polyamide having the formula:

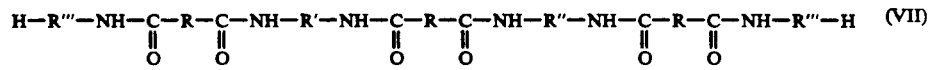

wherein:
a) R represents an aliphatic hydrocarbon group containing from 3 to about 34 carbon atoms or an aromatic group containing from 6 to about 34 carbon atoms,
b) R' represents a lower molecular weight oxypropylene group having the formula:

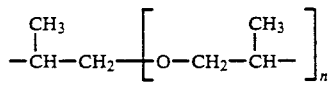

wherein n is a positive number having a value of 2 to about 15, and c) R'' represents a higher oxypropylene group having a molecular weight at least 600 molecular weight units higher than the molecular weight of said lower molecular weight oxypropylene group and having the formula:

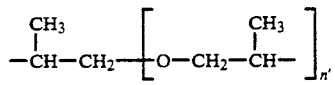

wherein n' is a positive number having a value of 15 to about 50, and d) R''' represents an oxyethylene group having the formula:

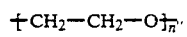

wherein n'' is a positive number having a value of 1 to 4.

12. A dihydroxy derivative as in claim 11 wherein R represents an aliphatic group.

13. A dihydroxy derivative as in claim 11 wherein the aliphatic group is a $C_4$ alkane group.

14. A dihydroxy derivative as in claim 13 wherein R''' represents a mono-oxyethylene group.

15. A dihydroxy derivative as in claim 13 wherein R''' represents a di-oxyethylene group.

16. A dihydroxy derivative as in claim 13 wherein R''' represents a tri-oxyethylene group.

17. A dihydroxy derivative as in claim 13 wherein R''' represents a tetra-oxyethylene group.

18. A dihydroxy derivative as in claim 11 wherein R represents an aromatic group.

19. A dihydroxy derivative as in claim 18 wherein the aromatic group is a phenyl group.

20. A dihydroxy derivative as in claim 19 wherein R'' represents a tetraoxyethylene group.

* * * * *